O. CZARAN.
HARVESTER REEL AND ACTUATING MECHANISM THEREFOR.
APPLICATION FILED FEB. 10, 1917.
1,299,685.
Patented Apr. 8, 1919.
3 SHEETS—SHEET 1.
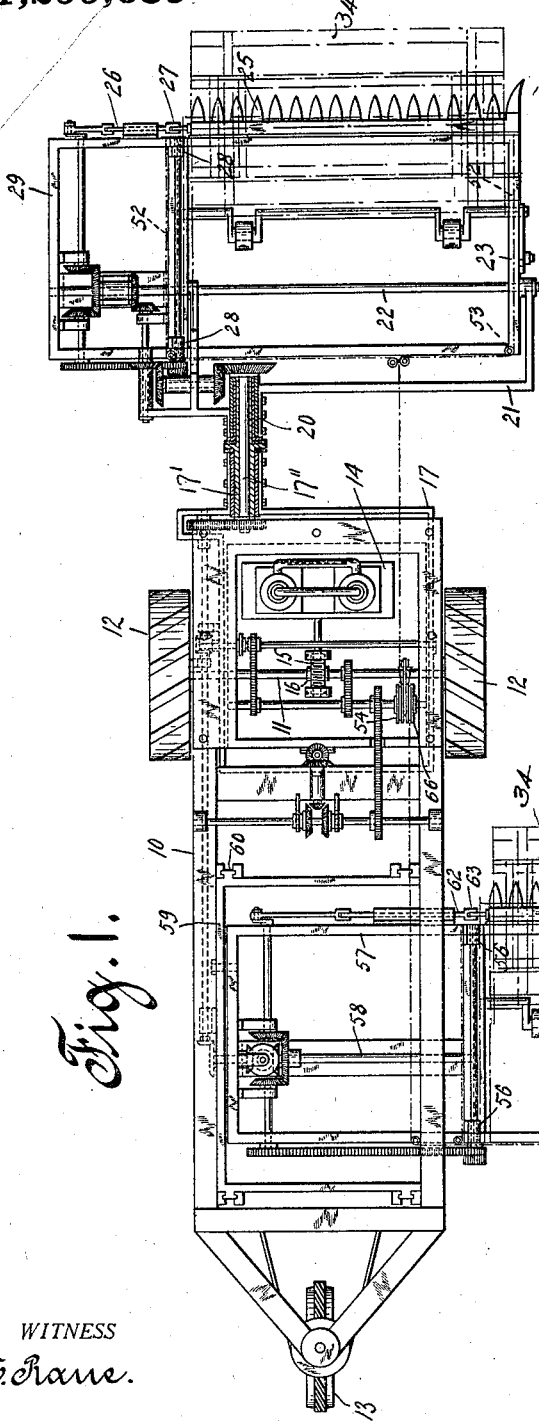
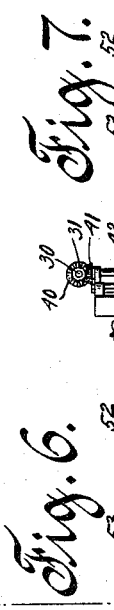
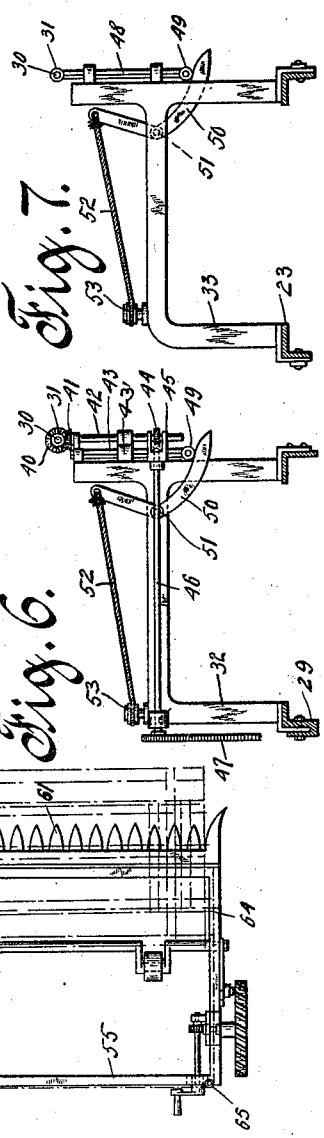
WITNESS
INVENTOR.
Otto Czaran
BY Sigmund Herzog
his ATTORNEY O. CZARAN.
HARVESTER REEL AND ACTUATING MECHANISM THEREFOR.
APPLICATION FILED FEB. 10, 1917.
1,299,685.
Patented Apr. 8, 1919.
3 SHEETS—SHEET 2.
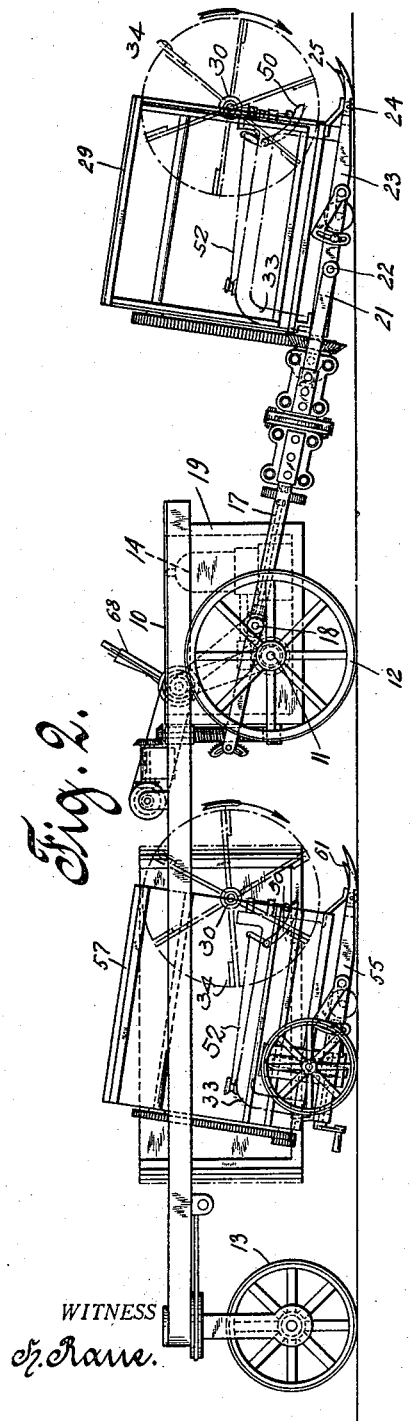
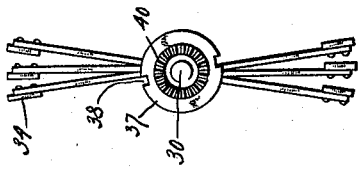
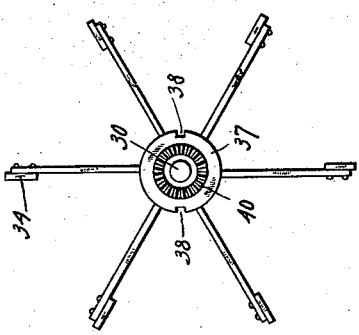
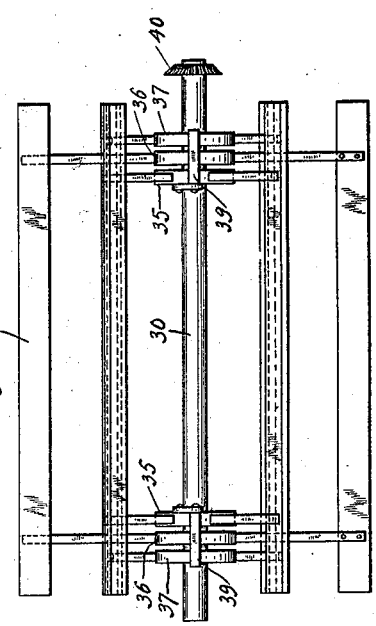

O. CZARAN.
HARVESTER REEL AND ACTUATING MECHANISM THEREFOR.
APPLICATION FILED FEB. 10, 1917.
1,299,685.
Patented Apr. 8, 1919.
3 SHEETS—SHEET 3.
Fig. 8.
Fig. 9.
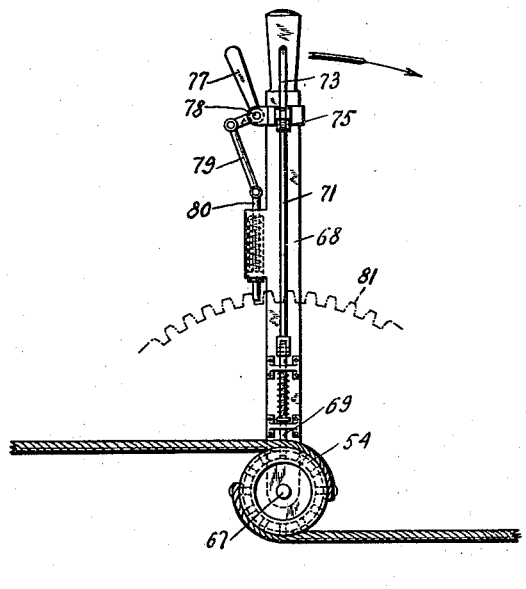
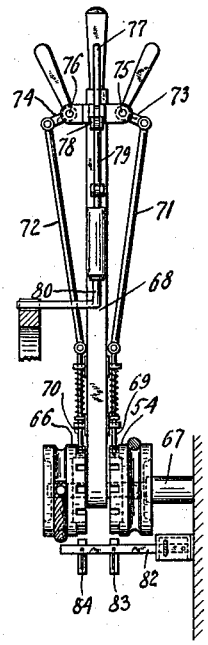
Fig. 10.
Fig. 11.
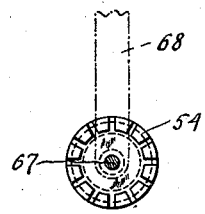
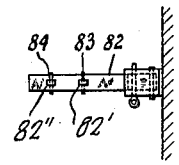
WITNESS
INVENTOR.
Otto Czaran
BY
his ATTORNEY

UNITED STATES PATENT OFFICE.

OTTO CZARAN, OF GLENDALE, NEW YORK.

HARVESTER-REEL AND ACTUATING MECHANISM THEREFOR.

1,299,685.          Specification of Letters Patent.          Patented Apr. 8, 1919.

Original application filed March 9, 1914, Serial No. 823,601. Divided and this application filed February 10, 1917. Serial No. 147,819.

*To all whom it may concern:*

Be it known that I, OTTO CZARAN, a subject of the King of Hungary, and a resident of Glendale, in the county of Queens and State of New York, have invented certain new and useful Improvements in Harvester-Reels and Actuating Mechanisms Therefor, of which the following is a specification.

The present invention relates to grain harvesters; more particularly to reels used in connection therewith and the actuating mechanisms for said reels. This application is divided out of application for U. S. Letters Patent, filed March 9, 1914, under Ser. No. 823,601, and for which Letters Patent No. 1,215,916 has been granted to me.

One of the objects of the invention is to produce a simple and inexpensive reel, the several fans of which can be folded so as to contact with each other.

Another object of the invention is to provide a harvester with a plurality of harvesting mechanisms, each of which has a reel shiftably disposed therein, in combination with means, common to all of said reels, for lowering or raising the same at will.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a plan view of a grain harvester constructed in accordance with the present invention, the binding attachments and parts of the elevators being removed, in order to more clearly show the construction; Fig. 2 is a side elevation of the device shown in Fig. 1; Fig. 3 is a front elevation of one of the reels thereof; Fig. 4 is a side elevation of the reel in its open position; Fig. 5 is a similar elevation of said reel in its folded position; Fig. 6 is a side elevation of one of the frames carrying the reel; Fig. 7 is a similar elevation of the other frame of the reel; Fig. 8 is a side elevation of the reel elevating mechanism; Fig. 9 is a front elevation of the device shown in Fig. 8; and Figs. 10 and 11 are details of the construction of the device shown in Figs. 8 and 9.

In the drawings the numeral 10 indicates the main frame of the machine, supported at its front portion by an axle 11, upon which the traction wheels 12 are mounted. At its rear end the frame is carried by a steering wheel 13. Upon its front end the frame carries a motor 14, preferably an internal combustion engine, the crank shaft of which may be connected, in any manner known in the art, with a differential gear, one of the spindles of said gear carrying a worm 15, in mesh with a worm gear 16, that is, in any suitable manner, fixedly attached to the axle 11.

An oblong shaped bracket 17 is pivoted to the main frame at 18, near its front end, said bracket embracing a box 19, in which the motor of the apparatus is mounted. At its front end the bracket 17 carries a bearing 17′, (as more fully described in my Letters Patent above mentioned) through which extends a spindle 17″. Over this bearing is drawn a sleeve 20, which is adapted to oscillate upon said bearing. To the sleeve are attached arms 21, which carry a horizontally extending transverse supporting rod 22, upon which is oscillatably disposed an elevator platform frame 23. This platform is, as usual, oblong in configuration, and supports the platform canvas of the usual shape and construction, (not shown in the drawings). The platform frame 23 rests upon rollers 24, which are, in any suitable manner, mounted upon the underface and near the front edge of said platform. A suitable platform raising means is provided, but not described herein, as it forms the subject matter of a separate application for Letters Patent.

The reciprocating knife of the cutting mechanism is indicated at 25, its actuating mechanism however, need not be described, as it does not form part of this invention, it being sufficient to mention that it includes a link 26, which is pivoted at 27, to the knife, said pivot being in alinement with hinges 28, by which the elevator frame 29 is connected to the platform frame 23.

The reel associated with the platform 23 comprises a shaft 30, that is rotatably journaled in bearings 31, the latter being carried by frames 32 and 33 (Figs. 6 and 7). The frame 32 is mounted upon the inclined elevator frame 29, and the frame 33 upon the platform frame 23. The several fans and arms 34 of the reel are attached to disks 35, 36 and 37, the disks 36 being keyed to the shaft 30, while the disks 35 and 37 are loosely mounted thereon (Fig. 3). The disks are provided with notches 38 upon diametrically opposite points thereof, which register with each other when the several fans and arms of the reel are in their normal operative positions, shown in Figs. 3 and 4 of the drawings. When in such positions, latches 39 are adapted to be seated in said recesses, thereby keeping the disks, and thus the fans, in their proper positions. If it is intended to fold the reel, the said latches are disengaged from the disks, thus permitting the several fans and arms of the reel to be folded into abutting positions, shown in Fig. 5 of the drawings. Upon the shaft 30 of the reel is mounted a bevel gear 40, in mesh with a bevel gear 41, that is carried by a vertically arranged spindle 42. This spindle is mounted in a frame 43, which is shiftable in guides 43', on the frame 32. By the frame 43 is carried the bearing 31 associated with the frame 32. The spindle 42 is provided with a key (not shown in the drawings), engaging a notch in a worm gear 44, that is held between a fork-shaped extension 45 upon the reel frame 32. With this worm gear meshes a worm upon a shaft 46, that is driven by a sprocket chain 47, the latter being actuated in any suitable manner from the axle 11 above described. The bearing 31, in which the other end of the reel shaft is journaled, is carried by a slide 48, that is mounted upon the frame 33. The lower ends of the shiftable frame 43 and of the slide 48 are provided with anti-friction rollers 49, normally resting upon bell-crank levers 50, which are pivoted at 51 to the frames 32 and 33. One end of each bell-crank lever is engaged by a wire rope 52, that runs over sheaves 53 and is attached to a notched pulley 54 (Figs. 8 to 10, inclusive), that is actuated in a manner hereinafter to be described for the purpose of raising or lowering the reel according to the height of the grain to be cut.

The machine is provided with a further cutting and binding mechanism, that is disposed upon one of the sides of the main frame 10. This mechanism comprises a platform 55, that is hinged at 56 to an inclined elevator frame 57, the latter being pivoted upon a transverse shaft 58, journaled in a box-like frame 59. This frame is vertically shiftable in the main frame by any suitable means, (for instance by the mechanism described for this purpose in my Letters Patent above referred to), and is properly guided by guides 60 upon the said frame. The platform 55 is provided with a knife 61, which is actuated in any suitable manner; the actuating mechanism including a link 62, pivoted at 63 to the knife, said pivot being in alinement with the hinges 56 above referred to. Upon the platform frame 55 are mounted frames (not shown), which are in all respects similar to the frames 32 and 33 that carry the reel of the front cutting mechanism. The frames upon the platform 55 carry the reel associated with the cutting mechanism 61. Bell-crank levers, similar to those denoted by the numeral 50 in Figs. 6 and 7 of the drawings, are mounted upon the reel frames on the platform 55, said levers being associated with wire ropes 64, which run over idlers 65 and are attached to a notched pulley 66.

The notched pulleys 54 and 66 are loosely mounted upon an arbor 67, that is journaled in the frame of the machine. To the arbor is fixedly attached a lever 68, and upon this lever are shiftably mounted two spring-pressed latches 69 and 70, the latch 69 coöperating with the notches in the pulley 54, and the latch 70 with the notches in the pulley 66. These latches are connected by links 71 and 72 with bell-crank levers 73 and 74, respectively, which levers are pivoted at 75 and 76, respectively, to the lever 68. A bell-crank lever 77 is pivoted at 78 to the lever 68, and connected by means of a link 79 with a spring-pressed latch 80, that is adapted to coöperate with the teeth of a gear segment 81, the latter being fixedly attached to the frame of the apparatus. Below the pulleys 54 and 66 is disposed a bracket 82, in which are formed apertures 82' and 82''. In these apertures are shiftably arranged dogs 83 and 84, respectively, the dog 83 being adapted to coöperate with the notches in the pulley 54, and the other dog with the notches in the other pulley.

The operation of the device is as follows: When the latches 69 and 70 engage each with a notch in the pulleys 54 and 66, the positions of the two reels on the two platforms are fixed. If it is intended to raise simultaneously both reels, the latch 80 is disengaged from the gear segment 81, and the lever 68 shifted in the direction of the arrow shown in Fig. 8 of the drawings, the latch being then engaged with one of the teeth of the gear segment 81, whereby the said reels are held in such raised positions. If it is intended to raise or lower only one of the reels, the dog coöperating with the pulley of the other reel is engaged with one of the notches in said pulley and the latch of the last named pulley disengaged thereform. The latch 80 is then disengaged from the gear segment and the lever 68 shifted in one or the other direction, as it may be intended to raise or lower one of said reels.

When the harvesting machine is being transported, the fans of both reels thereof are brought into the positions shown in Fig. 5 of the drawings, in which the fans of each reel abut against each other. Before folding up the platforms and the mechanisms thereon, the reels are shifted into substantially parallel relation with the longitudinal sides of the main frame 10.

While herein a particular harvester mechanism has been described, attention is called to the fact that the said mechanism *per se* does not form part of this invention, the same having been claimed in another application co-pending herewith, and of which this application is a division. The invention herein described lies mainly in the provision of a foldable reel, and in the means for lowering or raising the same at will. The reels are raised or lowered to positions that correspond to the height of the grain to be cut.

What I claim is:

1. In a harvesting machine, a reel comprising a shaft, two disks fixedly attached thereto, fans secured to said disks, a plurality of disks shiftably disposed upon said shaft, fans attached to pairs of said shiftable disks, all of said disks being provided with peripheral notches in registering relation when said fans are brought to their operative positions, and latches engaging the registering notches in said disks to keep said fans in proper relation when in operative positions.

2. In a harvesting machine, the combination with a frame, of two harvesting mechanisms carried thereby, a reel shiftably disposed upon each harvesting mechanism, and means common to both reels for lowering or raising the same at will simultaneously or independently of each other.

3. In a harvesting machine, the combination with a frame, of two harvesting mechanisms carried thereby, a reel shiftably disposed upon each harvesting mechanism, and means common to both reels for lowering or raising the same independently of each other at will.

Signed at New York, in the county of New York, and State of New York, this 3rd day of Feb., A. D. 1917.

OTTO CZARAN.

Copies of this patent may be obtained for five cents each, by addressing the "Commissioner of Patents Washington, D. C."